(12) United States Patent
Pandey et al.

(10) Patent No.: US 8,459,956 B2
(45) Date of Patent: Jun. 11, 2013

(54) CURVED PLATFORM TURBINE BLADE

(75) Inventors: Vidhu Shekhar Pandey, West Chester, OH (US); Ching-Pang Lee, Cincinnati, OH (US); Jan Christopher Schilling, Middletown, OH (US); Aspi Rustom Wadia, Loveland, OH (US); Brian David Keith, Cincinnati, OH (US); Jeffrey Donald Clements, Mason, OH (US)

(73) Assignee: General Electric Company, Schenectady, NY (US)

( * ) Notice: Subject to any disclaimer, the term of this patent is extended or adjusted under 35 U.S.C. 154(b) by 1203 days.

(21) Appl. No.: 12/344,058

(22) Filed: Dec. 24, 2008

(65) Prior Publication Data

US 2010/0158696 A1 Jun. 24, 2010

(51) Int. Cl.
F01D 5/14 (2006.01)

(52) U.S. Cl.
USPC .................. 416/243; 416/223 R; 416/193 A; 416/193 R; 416/190; 416/192

(58) Field of Classification Search
USPC .............. 416/223 R, 193 A, 193 R, 190, 192, 416/243
See application file for complete search history.

(56) References Cited

U.S. PATENT DOCUMENTS

| | | | |
|---|---|---|---|
| 3,986,793 A | 10/1976 | Warner et al. | |
| 5,017,091 A | 5/1991 | Tran | |
| 5,067,876 A | 11/1991 | Moreman | |
| 5,222,865 A | 6/1993 | Corsmeier | |
| 5,397,215 A | 3/1995 | Spear et al. | |
| 5,509,784 A | 4/1996 | Caruso et al. | |
| 6,017,186 A | 1/2000 | Hoeger et al. | |
| 6,283,713 B1 | 9/2001 | Harvey et al. | |
| 6,419,446 B1 | 7/2002 | Kvasnak et al. | |
| 6,511,294 B1 | 1/2003 | Mielke et al. | |
| 6,561,761 B1 | 5/2003 | Decker et al. | |
| 6,579,061 B1 | 6/2003 | Heyward et al. | |
| 6,669,445 B2 | 12/2003 | Staubach et al. | |
| 6,672,832 B2 | 1/2004 | Leeke et al. | |
| 6,682,306 B2 | 1/2004 | Murakami et al. | |
| 6,837,679 B2 | 1/2005 | Kawarada et al. | |
| 7,134,842 B2 | 11/2006 | Tam et al. | |
| 7,217,096 B2 | 5/2007 | Lee | |
| 7,220,100 B2* | 5/2007 | Lee et al. | 415/191 |
| 7,249,933 B2 | 7/2007 | Lee et al. | |

(Continued)

FOREIGN PATENT DOCUMENTS

| | | |
|---|---|---|
| EP | 0997612 A2 | 3/2000 |
| EP | 1669544 A1 | 6/2006 |
| EP | 1681438 A2 | 7/2006 |
| JP | 20008-95667 | 4/2008 |

OTHER PUBLICATIONS

Harvey et al, "Non-Axisymmetric Turbine End Wall Design: Part I Three-Dimensional Linear Design System," ASME 99-GT-337, Jun. 1999, pp: 1-9.
U.S. Appl. No. 12/238,785, filed Sep. 26, 2008, Kirtley et al.

(Continued)

*Primary Examiner* — Junghwa M Im
(74) *Attorney, Agent, or Firm* — General Electric Company; David J. Clement; Jonathan M. Hines

(57) ABSTRACT

A turbine blade includes an airfoil and integral platform at the root thereof. The platform is contoured in elevation from a ridge to a trough, and is curved axially to complement the next adjacent curved platform.

24 Claims, 3 Drawing Sheets

U.S. PATENT DOCUMENTS

2006/0153681 A1* 7/2006 Lee et al. .................... 416/97 R
2007/0258810 A1 11/2007 Aotsuka et al.
2008/0135530 A1 6/2008 Lee et al.

OTHER PUBLICATIONS

U.S. Appl. No. 12/330,783, filed Dec. 9, 2008, Pandey et al.

* cited by examiner

CURVED PLATFORM TURBINE BLADE

BACKGROUND OF THE INVENTION

The present invention relates generally to gas turbine engines, and, more specifically, to turbines therein.

In a gas turbine engine, air is pressurized in a compressor and mixed with fuel in a combustor for generating hot combustion gases. Energy is extracted from the gases in turbine stages which power the compressor and a shaft that typically drives a fan in an aircraft turbofan engine application.

A high pressure turbine (HPT) directly follows the combustor and receives the hottest gases therefrom from which energy is initially extracted. A low pressure turbine (LPT) follows the HPT and extracts additional energy from the gases.

As energy is extracted from the gases in the various turbine stages, the velocity and pressure distributions correspondingly vary, which in turn requires correspondingly different aerodynamic profiles of the turbine stator vanes and rotor blades. The size of the vanes and blades typically increases in the downstream direction for providing more surface area to extract energy from the combustion gases as the pressure thereof decreases.

The velocity of the gases also decreases as energy is extracted and the flowpath area increases, which in turn leads to changes in the span and thickness aspect ratios of the vanes and blades and corresponding camber thereof.

Fundamental to turbine efficiency is the aerodynamic performance of the individual turbine airfoils as the combustion gases are split along the leading edges thereof for corresponding flow along the generally concave pressure side of the airfoil and the generally convex suction side thereof. Differential pressure is effected between the opposite airfoil sides, and aerodynamic contour or camber of the airfoil is optimized for maximizing differential pressure without undesirable flow separation of the gases over the suction side.

The turbine flowpath is defined circumferentially between adjacent airfoils as well as radially between inner and outer flowpath surfaces. For the turbine nozzle, inner and outer bands integral with the vanes bound the flow. And for the turbine blades, radially inner platforms and radially outer tip shrouds bound the combustion gases.

A particular problem affecting turbine efficiency is the generation of undesirable vortices as the combustion gases are split along the airfoil leading edges near a flow boundary, such as the radially inner blade platforms. Two horseshoe vortices flow downstream on opposite sides of each airfoil and create undesirable turbulence in the flow. This turbulence can increase platform heating. And, migration of the vortices radially outwardly can decrease turbine efficiency.

The outer and inner flowpath boundaries in the typical gas turbine engine are axisymmetrical with constant diameter or radius from the axial centerline axis of the engine. The blade platforms, for example, are therefore axisymmetric with uniform circumferential curvature from their upstream forward ends to their downstream aft ends notwithstanding any axial inclination or slope thereof.

In previous turbine developments, it is known to selectively contour the flowpath boundaries to minimize the adverse affects of the horseshoe vortices. However, due to the complex three dimensional (3D) configuration of the turbine stages and the correspondingly complex 3D distributions of the velocity, pressure, and temperature of the combustion gases contouring of the flowpath boundaries is equally complex and is directly affected by the specific design of the specific turbine stage.

Accordingly, known flowpath contouring is highly specific to specific turbine stages and is not readily transferable to different stages whose efficiency and performance could instead be degraded.

Adding to the complexity of turbine blade design is the need to assemble individual blades into a supporting rotor disk. Each blade typically includes an axial entry dovetail integrally joined to the platform in a unitary assembly with the airfoil. The dovetail is axially straight and is inserted axially through a corresponding axial dovetail slot in the rotor disk.

The individual platforms have axially straight circumferential edges which adjoin each other in the full row of blades. Spline seals are mounted between the platform edges to improve turbine efficiency.

However, due to manufacturing tolerances of the outer surfaces, adjacent platforms may not be fully flush after assembly. One platform may be radially higher or radially lower than the adjacent platform causing a corresponding down step or up step.

The up step can cause a substantial reduction in aerodynamic performance as the combustion gas flow is locally blocked and diverted over the step onto the next adjacent platform.

Accordingly, it is desired to provide a platform having an improved configuration for improving turbine performance and efficiency.

BRIEF DESCRIPTION OF THE INVENTION

A turbine blade includes an airfoil and integral platform at the root thereof. The platform is contoured in elevation from a ridge to a trough, and is curved axially to complement the next adjacent curved platform.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
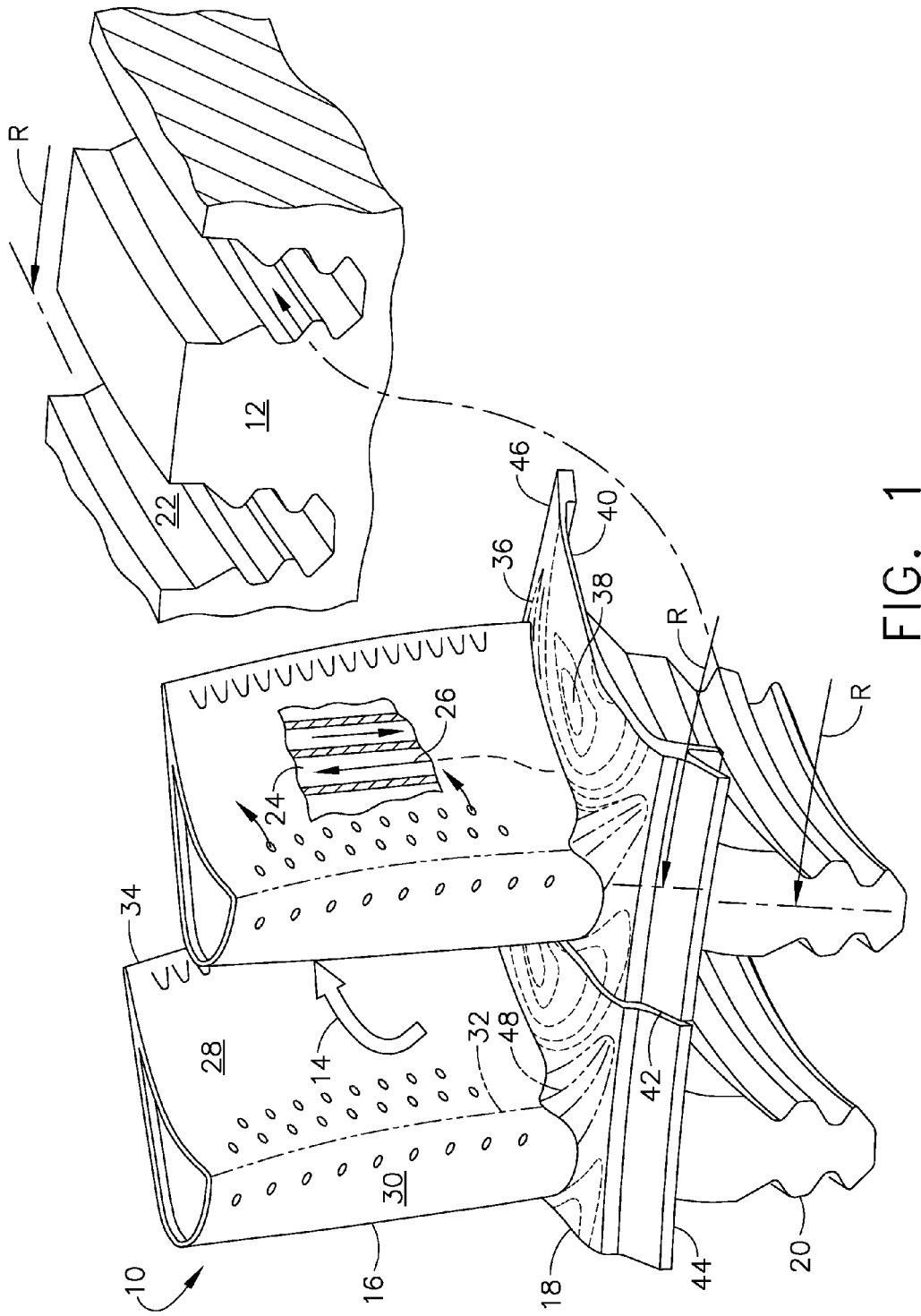
FIG. 1 is an isometric view of two adjacent turbine rotor blades having axial dovetails for mounting into corresponding dovetail slots in the perimeter of a turbine rotor disk.

Illustrated schematically in FIG. 1 are two adjacent HPT rotor blades 10 for use in the first stage of a gas turbine engine. The blades are arranged in a common row around the perimeter of a turbine rotor disk 12, shown in part, for use in extracting energy from hot combustion gases 14.

In the engine, air is pressurized in a compressor and mixed with fuel in a combustor for generating the combustion gases 14. The combustion gases are first discharged into the HPT and then a LPT which extract energy from the combustion gases in stages.

The HPT and LPT have corresponding rotors which drive corresponding rotors in the compressor and an upstream fan in a turbofan aircraft engine application. The first stage turbine rotor blades 10 receive the hottest combustion gases from the combustor and are specifically configured in 3D for maximizing performance and turbine efficiency.

Each turbine blade 10 includes an airfoil 16 integrally joined to a platform 18 and a dovetail 20 in a common, one piece or unitary casting. The dovetail includes tangs or lobes extending axially for defining an axial entry dovetail for being axially inserted into a corresponding axial dovetail slot 22 in the perimeter of the rotor disk 12.

Each airfoil 16 is hollow with an internal cooling circuit or channel 24 that receives pressurized cooling air 26 from the compressor for internally cooling the turbine rotor blade, with the spent cooling air being discharged through rows of film cooling holes distributed over the surface of the airfoil.

Each airfoil 16 includes laterally or circumferentially opposite pressure and suction sides 28,30 extending radially or longitudinally in span from the platform 18, and axially in chord between opposite leading and trailing edges 32,34. The airfoil has the typical airfoil or crescent profile from the leading edge increasing in width to a hump of maximum width and decreasing or tapering to a thin trailing edge.

As disclosed above in the Background section, the combustion gases 14 are split as they flow over the leading edge of the airfoil along both opposite sides thereof into the corresponding inter-airfoil flow passages. Horseshoe vortices are thusly created and decrease turbine efficiency.

In order to reduce the adverse affects of the horseshoe vortices, the outer surface of the platform 18 is specifically contoured in 3D elevation to include an elevated aft ridge 36 and a depressed central trough 38. This 3D endwall contouring (EWC) is determined by numerical flow analysis for the specific geometry of the airfoil for minimizing pressure losses due to the horseshoe vortices.

Correspondingly, both the platform 18 and dovetail 20 are similarly axially arcuate and not axially straight. In FIG. 1, the longitudinal centerline axis of the dovetail 20 has a lateral radius R that provides a small axial curvature in the dovetail, with the dovetail slot 22 of the supporting rotor disk 12 having an equal lateral radius R.

Each platform 18 has laterally or circumferentially opposite first and second splitline edges 40,42 which are similarly axially arcuate with corresponding values of the lateral radius R.

Figure 2:
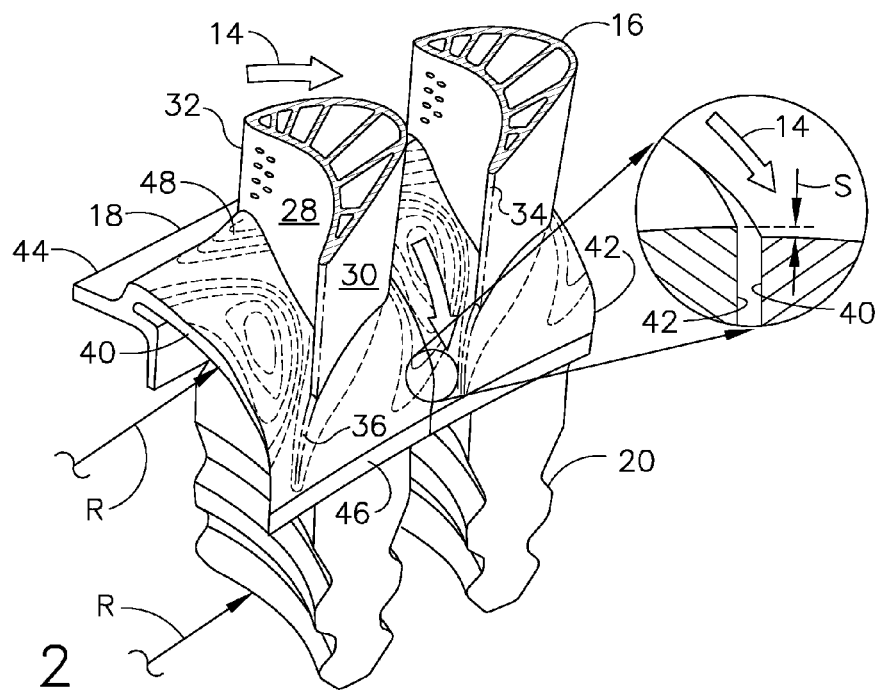
FIG. 2 is an isometric view of the two rotor blades illustrated in FIG. 1 having combustion gases discharged from the trailing edges thereof.
Figure 3:
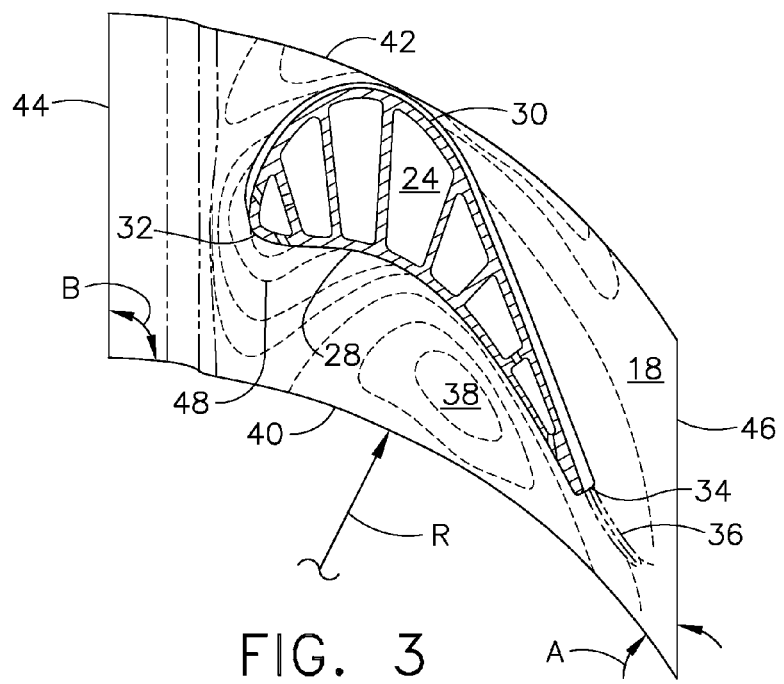
FIG. 3 is a top planiform view of one of the turbine rotor blades illustrated in FIGS. 1 and 2 having an axially curved platform.

As shown in FIGS. 2 and 3, adjacent platforms 18 adjoin each other at corresponding splitlines having conventional spline seals (not shown) therebetween for maintaining a continuous circumferential inner flowpath boundary for the hot combustion gases. The first splitline edge 40 is disposed on the pressure side of the airfoil on the pressure side of the platform. And, the second splitline edges 42 is disposed on the suction side of the airfoil on the suction side of the platform.

Both the airfoil pressure side 28 and the first edge 40 are laterally concave, and correspondingly, both the suction side 30 and the second edge 42 are laterally convex.

As best shown in FIG. 3, the first concave edge 40 has a constant lateral radius R between the airfoil leading and trailing edges 32,34. In other words, the platform first edge 40 is curved along a circular arc of constant radius from the leading edge or forward end 44 of the platform to the aft trailing edge or end 46 thereof.

Similarly, the convex second edge 42 of the platform is also laterally curved along a circular arc of constant radius between the platform forward and aft ends 44,46. The convex second edge 42 is parallel to the concave first edge 40 over the full axial length of the platform 18.

The laterally arcuate or curved platform 18 illustrated in FIG. 2 cooperates with the EWC of the outer surface of the platform for further increasing aerodynamic efficiency.

As indicated above in the Background section, the various dimensions of the turbine rotor blades are subject to typical manufacturing tolerances of a few mils. Accordingly, assembly of the rotor blades in the supporting rotor disk may effect locally different elevation of the adjoining platforms 18.

In FIG. 2, a local up step S is created between adjacent platforms near the airfoil trailing edges. The combustion gases 14 flow downstream between the airfoils in corresponding aerodynamic streamlines which flow generally along the curved splitline edges 40,42. The up step S causes pressure losses as the exhaust gases flow thereover during operation.

However, the laterally curved splitline edges 40,42 minimize those pressure losses of the platform step by reducing the incidence angle as the gases flow along and over the step.

The axially curved platform 18 has particular advantage in combination with the contoured platform outer surface including both the elevated ridge and depressed trough.

As shown in FIGS. 2 and 3, the aft ridge 36 adjoins the airfoil 16, and the trough 38 adjoins the first edge 40. And, the trough 38 extends from the airfoil leading edge 32 to the airfoil trailing edge 34 along the first edge 40.

Figure 4:
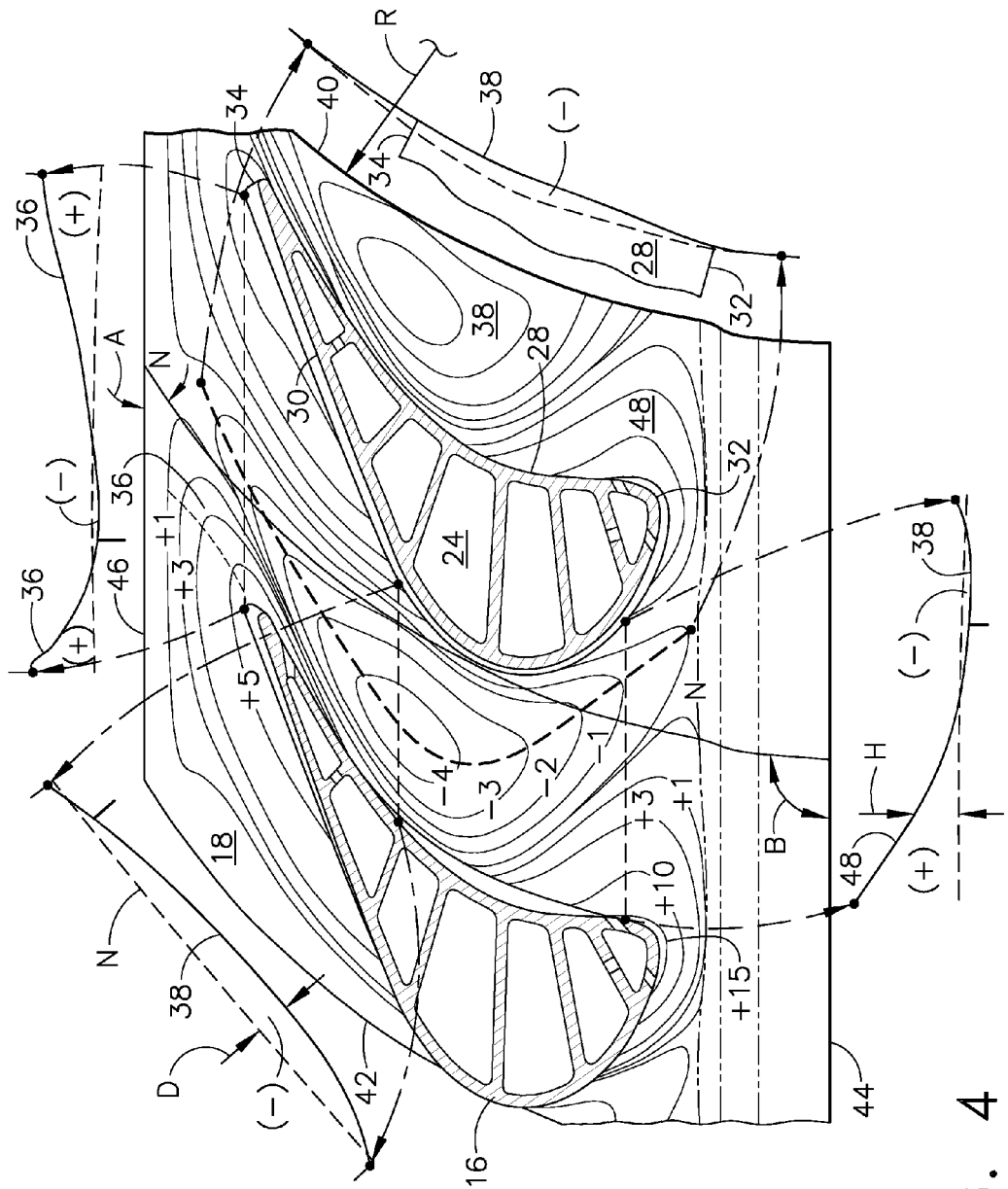
FIG. 4 is a top planiform view of the two rotor blades illustrated in FIGS. 1 and 2 with isoclines of common radial elevation and depression.

FIG. 4 illustrates two circumferentially adjacent turbine airfoils 16 extending radially outwardly from atop their corresponding curved platforms 18. Isoclines of common radial elevation H are shown relative to a nominal or reference elevation N which represents the axisymmetric or circular contour of a conventional turbine blade platform.

The specific EWC of the platform 18 includes elevated or positive portions (+) and depressed or negative portions (−) determined by numerical flow analysis for maximizing turbine efficiency. The exemplary isoclines have a normalized maximum value of about +16 in elevation and a minimum value in depth D of about −4.5 relative to the reference land N.

The aft ridge 36 is disposed atop the platform 18 and extends aft from the trailing edge 34. The concave first edge 40 correspondingly curves aft with the aft ridge 36 for matching the general curvature and camber of the pressure side of the airfoil.

The aft ridge 36 illustrated in FIG. 4 is a relatively narrow and sharp extension of the airfoil trailing edge 34, with the concave first edge 40 of the platform curving laterally from the aft ridge 36. Correspondingly, the depressed trough 38 is axially elongate and substantially wider than the narrow aft ridge 36, and is disposed laterally between the aft ridge 36 and the first edge 40

The aft ridge 36, trough 38, and first edge of 40 converge axially aft together and complement each other at the outlet end of the turbine airfoils for minimizing the adverse affects of any up step which might exist between the adjoining platforms.

The platform 18 also includes an elevated forward bulge or ridge 48 adjoining the leading edge 32 along the pressure side 28, and the first edge 40 curves forward with the forward ridge 48. The forward ridge 48, trough 38, and first edge 40 converge axially forward together.

The depressed trough 38 covers a majority of the surface area of the pressure side of the platform 18 and is relatively wide and long. Whereas the aft ridge 36 is relatively narrow and steep, the forward ridge 48 is relatively wide and substantially greater in elevation than the aft ridge 36.

Accordingly, the wide trough 38 is bounded or surrounded at its forward end by the forward ridge 48, at its aft end by the aft ridge 36, and laterally or circumferentially between the pressure side 28 and the first edge 40.

The forward ridge 48 has a maximum height of about +16 adjacent the leading edge 32 and decreases laterally to its junction with the first edge 40. The aft ridge 36 has a smaller maximum height of about +7 adjacent to the trailing edge 34, which is less than about half the height of the forward ridge 48, and decreases smoothly to its junction with the first edge 40.

The trough 38 has a maximum depth D of about −4.5 which is smaller in magnitude than the maximum heights of the aft and forward ridges in turn. The maximum depth portion of the trough 38 is located laterally between the first edge 40 and the pressure side 28 of the airfoil, and axially between the trailing edge 34 and the airfoil midchord at about 36% of the chord length from the trailing edge.

FIG. 4 illustrates the two adjacent airfoils 16 and their corresponding platforms 18. Each platform 18 extends laterally outwardly from both the pressure and suction sides of 28,30 of each turbine blade.

Accordingly, the endwall contouring of the outer surface of each platform includes complementary portions on opposite sides of the airfoil to provide substantially continuous EWC in each flowpath passage between adjacent airfoils, interrupted solely by the curved axial splitlines which define the opposite edges 40,42 of each platform.

A majority of the forward and aft ridges 48,36 and trough 38 is disposed on the pressure side of the airfoil, with smaller complementary portions thereof being disposed on the suction side of the airfoil. The smaller complementary portions of the EWC features extend axially along the convex second edge 42, which in this configuration is located closely adjacent to the airfoil suction side at about the maximum width of the airfoil.

As shown in FIG. 4, each platform 18 has substantial lateral curvature or radius R, with the concave first edge 40 conforming with the concave pressure side 28 of the airfoil, and the convex second edge 42 conforming with the convex suction side 30. The maximum width, hump region of the airfoil closely adjoins the convex second edge 42, with both the airfoil leading edge 32 and trailing edge 34 extending laterally opposite from the hump towards respective corners of the platform.

Accordingly, the concave first edge 40 joins the platform aft end 46 at an acute included angle A of about 37°. Since this corner of the platform is cantilevered from the supporting dovetail that included angle A should be as large as possible to minimize flexibility and stress in this aft corner during operation.

Correspondingly, the concave first edge 40 joins the platform forward end 44 at a larger, normal included angle B of about 90°. In this way, the concave curvature of the first edge 40 may be adjusted in magnitude and orientation to minimize the reduction in aft corner angle A, while maintaining a substantially normal forward corner angle B.

FIG. 4 illustrates a preferred configuration of the EWC including the elevated forward and aft ridges 48,36 and the depressed trough 38 located primarily in the platform pressure side and joining the concave first splitline edge 40.

Exemplary cross section profiles of the elevated ridges H(+) and the depressed trough D(−) are shown relative to the nominal or reference axisymmetric or circular profiles N shown in dashed line.

The EWC profile circumferentially between adjacent airfoil leading edges has a maximum elevation near the leading edge of the airfoil pressure side and decreases to the zero or nominal N reference value at about midway between the adjacent airfoils.

At the trailing edge, the EWC profile has locally maximum elevation at the corresponding pressure and suction sides of the adjacent airfoils, with the depressed trough straddling the splitline edges 40,42.

The midchord EWC profile includes primarily only the depressed trough 38 having a maximum depth near the circumferential middle of the pressure side platform slightly closer to the airfoil pressure side than to the concave first edge 40. The trough joins the opposite airfoils at small elevations corresponding with typical fillet junctions.

The centerline EWC profile of the axially elongate trough 38 illustrates a shallow depression of the trough from just forward of the airfoil leading edges to slightly aft of the airfoil trailing edges.

The axially curved platform 18 disclosed above may be used to advantage with various forms of the endwall contouring EWC for minimizing the adverse affects of any local step in elevation between adjacent blade platforms. The concave curvature of the first edge 40 conforms with the concave curvature of the airfoil pressure side and generally follows the predominant direction of the flow streamlines of the combustion gases as they flow downstream between adjacent turbine airfoils.

The curved platform has particular advantage for the elevated ridges where they join the axial splitlines. Since the aft ridge 36 is relatively steep and narrow and would otherwise bridge a straight axial splitline, the concave splitline edge 40 occurs at the aft end of the aft ridge where its elevation is relatively shallow.

Similarly, the concave splitline edge 40 joins the forward ridge 48 where its elevation is relatively shallow.

Since the combustion gases are discharged from the upstream turbine nozzle with substantial oblique swirl, they flow obliquely into the flow passages locally at the leading edges of the airfoils and are discharged from those passages at an opposite oblique angle at the trailing edges, either up steps or down steps may be effected at the forward or aft ends of the platforms depending upon the random variation in relative elevation between any two adjacent platforms.

The curved splitline generally conforms with the curved flow streamlines between adjacent airfoils and minimizes pressure losses in any elevational steps between adjacent platforms, while further improving aerodynamic performance of the EWC specifically configured for minimizing the associated pressure losses from the horseshoe vortices.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
   an airfoil integrally joined to a platform and a dovetail, and having laterally opposite pressure and suction sides extending longitudinally in span from said platform, and axially in chord between opposite leading and trailing edges;
   said platform being contoured in elevation to include an elevated ridge and a depressed trough having complementary portions on said opposite sides of said airfoil between laterally opposite first and second splitline edges; and said dovetail and said first and second edges being axially arcuate at correspondingly constant lateral radii, wherein both said pressure side and first edge are laterally concave, and both said suction side and second edge are laterally convex.

2. A blade according to claim 1 wherein said ridge adjoins said airfoil, and said trough adjoins said first edge.

3. A blade according to claim 2 wherein said trough extends from said leading edge to said trailing edge along said first edge.

4. A blade according to claim 3 wherein said ridge is disposed aft atop said platform and extends aft from said trailing edge, and said first edge curves aft with said aft ridge.

5. A blade according to claim 4 further comprising an elevated forward ridge adjoining said leading edge along said pressure side, and said first edge curves forward with said forward ridge.

6. A blade according to claim 5 wherein said trough is disposed laterally between said first edge and both said forward and aft ridges.

7. A blade according to claim 5 wherein:
said aft ridge, trough, and first edge converge axially aft together; and
said forward ridge, trough, and first edge converge axially forward together.

8. A blade according to claim 5 wherein said trough is bounded forward by said forward ridge, aft by said aft ridge, and laterally between said pressure side and said first edge.

9. A blade according to claim 8 wherein said forward ridge has a maximum height adjacent said leading edge, said aft ridge has a smaller maximum height adjacent said trailing edge, and said trough has a smaller maximum depth laterally between said first edge and pressure side and axially between said trailing edge and a midchord of said airfoil.

10. A turbine blade comprising:
an airfoil integrally joined to a platform and a dovetail;
said platform being contoured in elevation to include an elevated ridge and a depressed trough; and
both said platform and dovetail being axially arcuate, wherein said platform has laterally opposite first and second splitline edges being axially arcuate at a lateral radius, and said dovetail has a similar lateral radius.

11. A blade according to claim 10 wherein:
said airfoil includes laterally opposite pressure and suction sides extending longitudinally in span from said platform, and axially in chord between opposite leading and trailing edges; and
both said pressure side and first edge are laterally concave, and both said suction side and second edge are laterally convex.

12. A blade according to claim 11 wherein said ridge adjoins said airfoil, and said trough adjoins said first edge.

13. A blade according to claim 12 wherein said trough extends from said leading edge to said trailing edge along said first edge.

14. A blade according to claim 13 wherein said first edge has a constant lateral radius between said leading and trailing edges.

15. A blade according to claim 13 wherein said ridge is disposed aft atop said platform and extends aft from said trailing edge, and said first edge curves aft with said aft ridge.

16. A blade according to claim 15 wherein said first edge curves laterally from said aft ridge.

17. A blade according to claim 16 wherein said trough is disposed laterally between said aft ridge and said first edge.

18. A blade according to claim 15 wherein said aft ridge, trough, and first edge converge axially aft together.

19. A blade according to claim 15 further comprising an elevated forward ridge adjoining said leading edge along said pressure side, and said first edge curves forward with said forward ridge.

20. A blade according to claim 19 wherein said forward ridge, trough, and first edge converge axially forward together.

21. A blade according to claim 19 wherein said trough is bounded forward by said forward ridge, aft by said aft ridge, and laterally between said pressure side and said first edge.

22. A blade according to claim 21 wherein said forward ridge has a maximum height adjacent said leading edge, said aft ridge has a smaller maximum height adjacent said trailing edge, and said trough has a smaller maximum depth laterally between said first edge and pressure side and axially between said trailing edge and a midchord of said airfoil.

23. A blade according to claim 19 wherein said platform along said suction side includes complementary portions of said forward and aft ridges and trough therebetween extending axially along said second edge.

24. A blade according to claim 19 wherein said first edge of joins a trailing edge of said platform at an acute included angle, and joins a leading edge of said platform at a normal included angle.

* * * * *